United States Patent [19]

Foley et al.

[11] 4,273,969

[45] Jun. 16, 1981

[54] COMMUNICATIONS HEADSET MOUNTABLE OVER THE EAR

[75] Inventors: James P. Foley, Astoria; Bernard F. Kloek, Brooklyn; Michael D'Agostino, Staten Island, all of N.Y.

[73] Assignee: Roanwell Corporation, New York, N.Y.

[21] Appl. No.: 44,572

[22] Filed: Jun. 1, 1979

[51] Int. Cl.³ ............................................. H04M 1/05
[52] U.S. Cl. ............................... 179/156 A; 339/6 R; 174/86
[58] Field of Search .......... 179/156 A, 156 R, 107 H, 179/178; 174/86; 339/6 R, 6 A, 7, 8 R

[56] References Cited

U.S. PATENT DOCUMENTS

| | | | |
|---|---|---|---|
| D. 218,173 | 7/1970 | Hutchings | D26/14 |
| 2,733,491 | 2/1956 | Saccoccio | 24/252 |
| 3,280,273 | 10/1966 | Flygstad et al. | 179/156 A |
| 3,459,873 | 8/1969 | Harris et al. | 339/7 |
| 3,548,118 | 12/1970 | Hutchings | 179/156 A |
| 3,691,319 | 9/1972 | Bee | 179/156 A |
| 3,735,021 | 5/1973 | Bonis et al. | 179/156 A |
| 3,862,378 | 1/1975 | Norris | 179/156 A |
| 3,971,900 | 7/1976 | Foley | 179/156 A |
| 4,022,518 | 5/1977 | Gettaz | 339/8 R |
| 4,209,264 | 6/1980 | Hellberg | 179/156 R |

OTHER PUBLICATIONS

"Instructions—How to Use your New Model R-71 Operator's Headset," Roanwell Corporation.

Primary Examiner—Gerald L. Brigance
Attorney, Agent, or Firm—Cooper, Dunham, Clark, Griffin & Moran

[57] ABSTRACT

This headset includes a capsule intended for mounting over either ear of the wearer. The surface of the headset capsule adjacent to the ear is contoured to fit snugly behind either ear. A microphone is mounted on a boom projecting from the front end of the capsule. The boom is tiltable and rotatable so that the position of the microphone may be adjusted relative to the mouth. The rotatability of the boom on the capsule permits adaptation of the headset for wear over either the right or left ear. The boom is curved to keep it out of contact with the face of the wearer. An ear tube extends from the lower end of the capsule at the central plane thereof and is flexible so that it may engage either the right or left ear, depending on the location of the headset. The bottom of the capsule is provided with an ear clip for the purpose of maintaining the position of the capsule and microphone during motion of the head. This ear clip assembly captures the ear lobe and is adjustable to encompass a wide range of ear sizes. The ear clip assembly is removable and reversible so that it may grip the lobe of either the right or left ear of the wearer.

17 Claims, 12 Drawing Figures

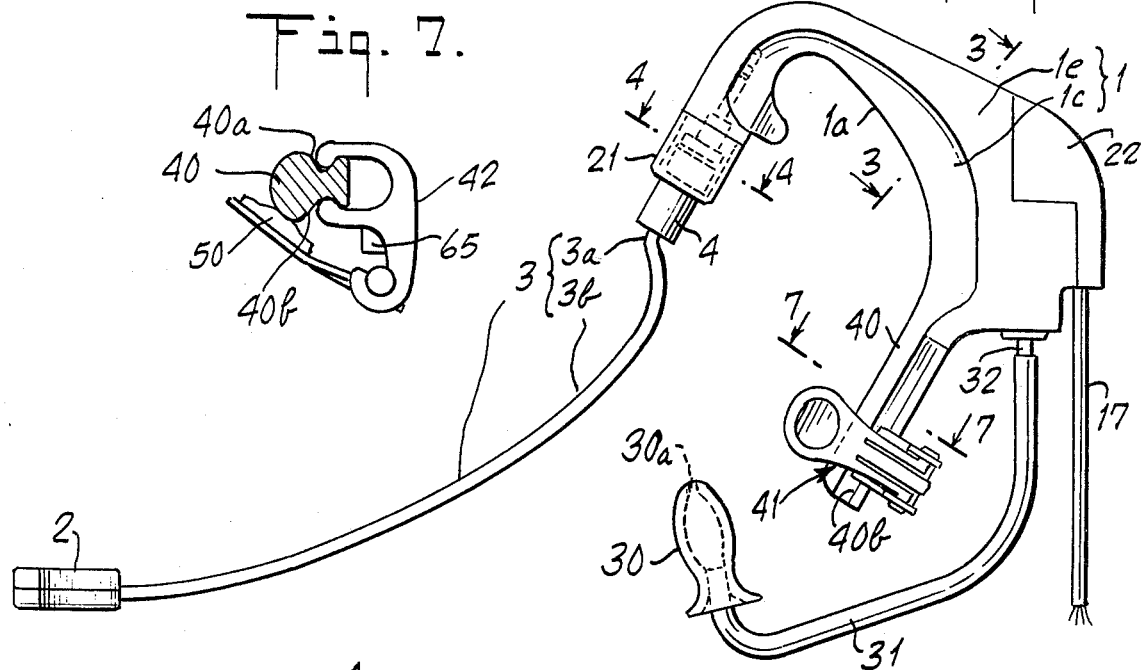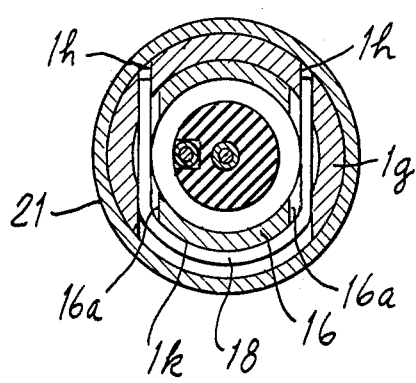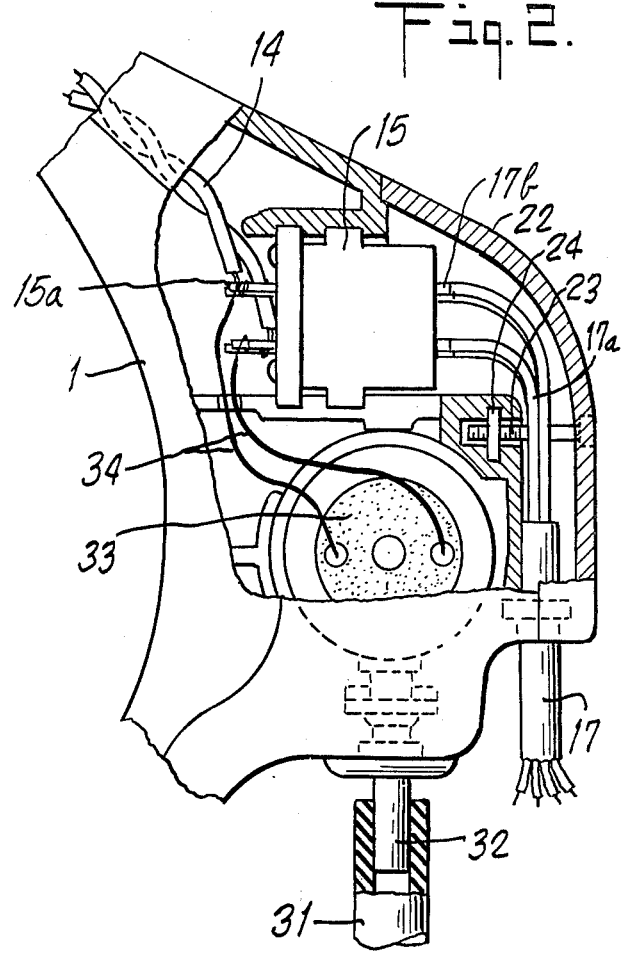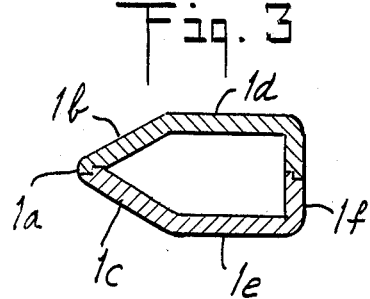

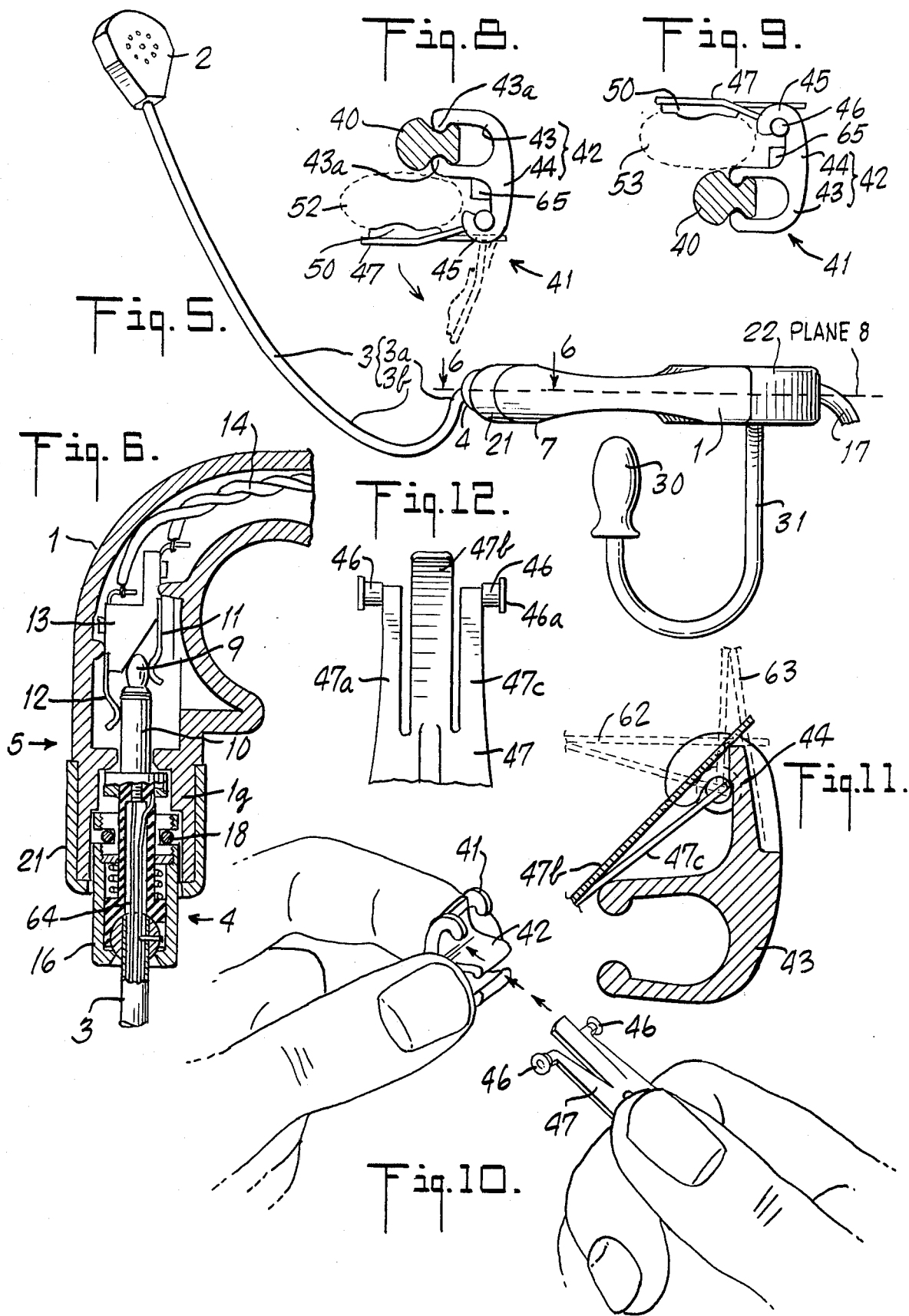

COMMUNICATIONS HEADSET MOUNTABLE OVER THE EAR

PRIOR ART REFERENCES

The headset of the present invention utilizes the microphone shown in detail in the patent to Poradowski, U.S. Pat. No. 4,009,255, assigned to the assignee of the present application.

The headset also uses a rotatable electrical connector similar to that shown in the patent to Foley, U.S. Pat. No. 3,971,900, also assigned to the assignee of the present application.

The ear clip shown in the present application is an improvement on the ear clip shown in the patent to Saccoccio, U.S. Pat. No. 2,733,491.

BRIEF SUMMARY OF THE INVENTION

The headset capsule is symmetrical about a central fore and aft plane, and so fits equally well behind either ear. The microphone is mounted so that its position may be adjusted and the microphone supporting boom is rotatable to adapt the headset to be worn over either the right or left ear. An ear tube extends from the lower end of the capsule at the central plane and is flexible so that it may engage either the right or left ear, depending on the location of the capsule.

A projection on the bottom of the capsule is provided with an ear clip which is adjustable and removable so that it may be mounted to grip gently the lobe of either the right or left ear of the wearer, so as to stabilize the headset.

The projection on the headset capsule is elongated and has a pair of parallel grooves in its opposite sides, the grooves being open at their lower ends. A slider includes a channel having opposed rounded projections at the ends of the channel sides, which frictionally and slidably engage the grooves. A plate extends laterally from the bight of the channel and is provided on one side with a pair of parallel bearing hooks, open toward the channel. A three-pronged arm of stiffly flexible material has its center prong engaging the one side of the plate between the bearing hooks. This center prong acts as a spring and provides the force necessary to gently grip the ear lobe. The other two prongs carry trunnions received in the bearing hooks on the plate. The three-pronged arm carries at its opposite end a cushioned pad for engaging the wearer's ear lobe. The arm is self-biased for movement to either a stable retracted position in which the pad is spaced from the wearer's ear, or a stable clasping position in which the cushioned pad engages the wearer's ear lobe. The arm moves between those positions with a snap action.

DRAWINGS

FIG. 1 is a side elevational view of a headset embodying the invention, with the microphone and its supporting boom rotated 90° from its operating position.

FIG. 2 is an enlarged fragmentary view showing a portion of the headset of FIG. 1, with certain parts broken away and others shown in section.

FIG. 3 is a sectional view taken on the line 3—3 of FIG. 1.

FIG. 4 is a sectional view on the line 4—4 of FIG. 1.

FIG. 5 is a plan view of the headset of FIG. 1, with the microphone and its supporting boom shown in a normal operating position.

FIG. 6 is a fragmentary sectional view on an enlarged scale, taken on a portion of the line 6—6 of FIG. 5.

FIG. 7 is a sectional view on the line 7—7 of FIG. 1.

FIG. 8 is a sectional view similar to FIG. 7, but showing the ear clip gripping a wearer's left ear lobe.

FIG. 9 is a view similar to FIG. 8, but showing the ear clip gripping a wearer's right ear lobe.

FIG. 10 is a perspective view, illustrating a step in the assembly of parts of the ear clip.

FIG. 11 is a fragmentary view similar to FIG. 9, but on an enlarged scale, showing the ear clip after the assembly of FIG. 10, in three positions.

FIG. 12 is a fragmentary plan view of an arm forming part of the ear clip.

DETAILED DESCRIPTION

The headset includes a capsule 1 having a transversely rounded inner surface 1a (FIG. 3) adapted to engage the periphery of the wearer's auricle. The rounded surface 1a merges tangentially with surfaces 1b and 1c which define a tapering portion of the capsule whose thickness increases in the direction away from the wearer's ear. A peripheral portion of the capsule has lateral surfaces 1d, 1e adjoining the tangential surfaces 1b, 1c at the thick end of the tapering portion. The outer surface of the capsule is defined by a wall 1f. Part of the capsule constitutes a removable cover 22.

The contour of the capsule permits it to fit readily behind either the left or right ear of the wearer. The capsule is symmetrical about a central plane 8, shown by the center line 6—6 in FIG. 5.

A microphone 2, which may be of the type shown in the patent to Poradowski, U.S. Pat. No. 4,009,255, is mounted on the end of a boom 3, which encloses two conductors 64 (FIG. 6) connected to the microphone 2. The other end of the boom 3 is supported on a swivel joint 4 mounted on a rotatable connector element 5 similar to that shown in Foley patent U.S. Pat. No. 3,971,900, issued July 27, 1976.

The connector element 5 terminates at its upper end, as seen in FIG. 6, in two coaxial conductors 9 and 10, which respectively cooperate with stationary contacts in the form of spring fingers 11 and 12 supported on a block 13 fixed within the capsule 1. The spring fingers 11 and 12 are connected to a pair of conductors 14 which are in turn connected to two of four pins 15a (FIG. 2) supported by a mounting block 15, fixed in the capsule 1. The pins 15a in the block 15 are connected to receptacles 17b which are in turn connected to conductors 17a cabled together as a cord set 17 in FIG. 2 and extending outside the capsule 1.

Just outside the swivel joint 4, the boom 3 is provided with a sharp curve 3a (FIG. 5) which carries the more remote parts of the boom outwardly away from the wearer's face. Thereafter, the boom is curved more gradually in the opposite direction as shown at 3b so that the microphone 2 may be supported adjacent the wearer's mouth without any contact between the wearer's face and the boom 3.

The swivel joint 4 is received in a hollow cylindrical end portion 1g of the capsule 1. The swivel joint 4 includes an outer cylindrical member 16 which fits snugly within the hollow cylindrical end portion 1g. The end portion 1g is provided with a pair of apertures 1h (FIG. 4) connected at one end by a slot 1k. A U-shaped locking retainer 18 has the bight of the U received within the slot 1k, and the arms of the U extending through the apertures 1h and also through slots 16a in the cylindrical member 16. After the locking retainer 18 is inserted in the slots 1k and the apertures 1h, a retainer cap 21 is slidably and frictionally fitted over the outside of the end portion 1g of the capsule, to keep the locking retainer 18 from sliding out.

The capsule 1 includes a removable cover 22 to provide access to the conductors 17a. The cover 22 may be held in place by any suitable means, such as a screw 23 and nut 24 (FIG. 2).

An ear plug 30 having an aperture 30a in its tip fits on the end of an ear tube 31, whose opposite end is rotatably coupled to an acoustic tube 32 fixed in the capsule 1. The tube 32 is in acoustic communication with a transducer 33 (FIG. 2) connected by electrical conductors 34 to the other two pins 15a on the supporting block 15. The transducer 33 is preferably enclosed in an elastomeric boot (not shown) to provide a shockproof mounting.

At its lower end the capsule 1 is provided with a downwardly and forwardly extending projection 40 which is adapted to extend behind the lobe of the ear of the wearer. The projection 40 is provided on its inner and outer sides with opposed grooves 40a and 40b. The contours of the projection 40 are rounded, as best seen in FIGS. 7-9, for the comfort of the wearer's ear. An ear clip means, shown generally at 41, (FIGS. 1 and 8) is adjustably and removably mounted on the projection 40. The ear clip means 41 includes a body 42 comprising a channel 43 and a base plate 44 extending laterally from the bight of the channel 43. The flanges of the channel 43 are provided with opposed rounded projections or beads 43a at their outer ends. The ear clip means 41 is so designed that, when unstressed, the spacing between the rounded projections 43a is slightly less than the distance between the bottoms of the grooves 40a and 40b in the projection 40. These grooves are open at their lower ends. The ear clip means 41 may be mounted on the projection 40 by spreading the rounded projection 43a of the channel 43 slightly so that they enter the grooves 40a, 40b. The ear clip means 41 can then be slipped along the projection 40 and will remain in any vertical position in which it is set, due to the friction between the rounded projections 43a and the projection 40. At the end of the base plate 44 remote from the channel 43, are formed a pair of bearing hooks 45 which are open at their sides facing the channel 43. The hooks 45 are adapted to receive trunnions 46. An arm 47 has one end formed with three prongs 47a, 47b and 47c. The outer prongs 47a and 47c are formed with outwardly projecting fingers at their tips. On the fingers are mounted, as by soldering or other suitable means, eyelets which serve as trunnions 46. The eyelets are flanged at their outer ends as shown at 46a in FIG. 12.

The opposite end of the arm 47 carries a cushioned pad 50 of yieldable material, which will comfortably engage the lobe of the wearer's ear.

The arm 47 is made of stiffly flexible material, having a substantial spring rate. It is assembled on the ear clip means 41 as shown in FIG. 10, by moving the arm 47 toward the ear clip means 41 in the direction shown by the arrows, such that the trunnions 46 move into the open sides of the bearing hooks 45. At the same time, the middle prong 47b of the arm 47 rides over the edge of base plate 44. The final movement of the trunnions 46 into the bearing hooks 45 is accompanied by a deflection of the prongs 47a and 47c in one direction and a deflection of the middle prong 47b in the opposite direction. The flanges 46a hold the arm 47 against axial slipping in the bearing hooks 45. After assembling the arm 47 to ear clip means 41, a retainer block 65 may be secured to plate 44 to prevent arm 47 from becoming disengaged from bearing hook 45. In order to mount the ear clip means 41 on the projection 40, the arm 47 must be pivoted from the initial assembly position, where the prongs are in the positions shown in full lines in FIG. 11, to the position 62 shown in dotted lines in FIG. 11.

FIG. 8 shows the ear clip means 41 mounted on the projection 40 in the position used when the headset is mounted on the left side of the head and the ear clip means is gripping the lobe of the wearer's left ear, which is shown at 52 between the arm 47 and the projection 40. If it is desired to mount the headset over the wearer's right ear, then the slider 41 is slipped off the projection 40, turned over, and mounted in the manner shown in FIG. 9, where the wearer's right ear is shown at 53, clasped between the arm 47 and the projection 40.

The boom 3 is continuously rotatable in the swivel joint 4. When the headset is mounted on the wearer's left ear, the boom is placed in the position shown in FIG. 5. Since the boom is both rotatable and tiltable on the swivel joint 4, its position can be varied to accommodate the requirements of the wearer. When the headset is mounted on the right side of the head, the boom 3 is simply rotated 180° from the position shown in FIG. 5, so that the microphone 2 extends to the left from the center line 8, rather than to the right, as shown in FIG. 5.

The ear tube 31 may be manipulated to introduce the plug 30 either into the wearer's left or right ear, depending upon the location of the headset. The microphone 2 and the boom 3 may be manipulated to bring the microphone into a convenient position adjacent the wearer's mouth.

When the headset is to be mounted on the wearer's right ear, the slider 41 must be slipped off projection 40 and turned over so that the arm 47 is in the position shown in FIG. 9. The microphone 2 and the boom 3 may be rotated in the swivel joint 4 to bring the microphone into a convenient position adjacent the wearer's mouth.

When the ear clip means 41 is yieldably engaging one of the wearer's ears, as in FIGS. 8 and 9, the prongs 47a, b, c are in the positions shown in dotted lines at 62 in FIG. 11. When it is desired to release the ear lobe from the ear clip means, the arm 47 is rotated to bring the prongs 47a, b, c to the dotted line position 63 in FIG. 11. The arm moves between positions 62 and 63 with a snap action.

We claim:
1. A communications headset including:
    a. a capsule adapted to fit over the ear of a wearer, said capsule having a transversely rounded inner surface adapted to contact the periphery of the auricle of the wearer's ear, tangential surfaces diverging from the rounded surface to form a tapering portion of the capsule whose thickness increases in the direction away from the ear, and a peripheral portion of the capsule having lateral surfaces adjoining the tangential surfaces at the thicker end of the tapering portion;
    b. microphone means supported on one end of the capsule; and
    c. acoustic tube means communicating with the capsule and adapted to engage the wearer's ear.
2. A communications headset as in claim 1, including ear clip means adjustably mounted on the lower end of the capsule and adapted to engage releasably the lobe of the wearer's ear.

3. A communications headset as in claim 2, in which said clip means includes:
   a. a projection on the lower end of said capsule extending downwardly therefrom and adapted to fit between the lobe of the wearer's ear and the head of the wearer;
   b. a slider frictionally engaging said projection and adjustably movable along said projection; and
   c. an arm pivotally mounted on the slider and movable to engage the outside of the wearer's ear lobe and clasp it against the projection.

4. A communications headset as in claim 3, including spring means operable to bias the arm either to an ear lobe engaging position or to a position spaced from the wearer's ear lobe.

5. A communications headset as in claim 2, in which said clip means includes:
   a. a downwardly extending projection on the lower end of said capsule, said projection having grooves on opposite surfaces thereof;
   b. a slider including a channel defined by flanges with opposed beads having unstressed positions closer than the dimension of the downwardly extending projection between said grooves, so that the opposed projections are held in yieldable engagement with the grooves, and the channel is frictionally adjustable along the grooves.

6. A communications headset as in claim 5, in which the grooves are open at their lower ends, and the channel is detachable from the capsule by moving it beyond the open ends of the grooves.

7. A communications headset as in claim 6, including:
   a. a plate projecting laterally from the channel, said slider being reversibly mountable on the projection with the plate extending either to the left or right to accommodate use of the headset on either the left or right sides of the wearer's head; and
   b. an arm pivotally mounted on the projecting plate and movable to engage the outside of the wearer's ear lobe and clasp it against the projection.

8. A communications headset as in claim 1, in which:
   a. said microphone means includes:
      1. a microphone;
      2. a boom supporting the microphone and extending therefrom to an end adjacent the capsule; and
      3. a first pair of electrical conductors fixed within and insulated from the boom and connected to the microphone;
   b. said capsule encloses a second pair of electrical conductors; and
   c. said headset includes connector means providing rotatable electrical connections between the conductors in the boom and the conductors in the capsule; said connector means including:
      1. a hollow cylindrical upper forward end portion of the capsule, said hollow end portion having apertures aligned along a secant of right cross-section of the cylindrical portion;
      2. a cylindrical member slidably received within said hollow portion, said cylindrical member having a slot in its periphery aligned with said apertures;
      3. said boom and the first pair of conductors being rotatable as a unit within said cylindrical member;
   4. said second pair of conductors being within said hollow end portion, the conductors of said first pair engaging the respective conductors of the second pair when the cylindrical member is received in said hollow portion;
   5. a retainer slidable through the apertures and the slot when they are aligned and thereby effective to prevent relative movement of said cylindrical member and said hollow portion; and
   6. a cap having frictional engagement with the outside of said hollow end portion and covering the apertures to lock the retainer in place.

9. A communications headset adapted for mounting over either ear of a wearer, including:
   a. a capsule symmetrical with respect to a central plane and having an internal outline in said plane conforming generally to the periphery of a human ear, said outline being defined by a transversely rounded inner surface adapted to contact the periphery of the wearer's ear, said capsule having two tangential surfaces diverging symmetrically from the rounded surface to form a tapering portion of the capsule whose thickness increases in the direction away from the ear, and a pair of lateral surfaces connecting the respective diverging surfaces to an outer surface, said lateral surfaces and said outer surface cooperating to define a peripheral portion of the capsule connected to the outer ends of said tangential surfaces and adjoining the thicker end of the tapering portion;
   b. microphone means;
   c. means supporting the microphone means on the capsule at said plane for movement in either direction with respect to the plane, so as to locate the microphone means adjacent the wearer's mouth whether the capsule is mounted on the right or left ear of the wearer;
   d. acoustic tube means communicating with the capsule and adapted to engage the wearer's ear;
   e. means connecting the tube means to the capsule at said central plane for movement to locate the other end of the tube means adjacent the wearer's ear whether the capsule is mounted on the right or left ear of the wearer; and
   f. ear clip means detachably mounted on the lower end of the capsule and adapted to engage the lobe of one ear of the wearer, said ear clip means being mountable in either of two positions, respectively suitable for engaging the right or left ear of the wearer.

10. A communications headset as in claim 9, in which said clip means includes:
   a. a downwardly extending projection on the lower end of said capsule, said projection having grooves on opposite surfaces thereof, said grooves being open at their lower ends;
   b. a channel defined by flanges with opposed beads having unstressed positions closer than the dimension of the downwardly extending projection between said grooves so that the channel is frictionally attachable to the projection by spreading the flanges, the beads are then held in yieldable engagement with the grooves, and the channel is frictionally adjustable along the grooves, and removable therefrom through said open ends; and
   c. an arm pivotally mounted on the channel and movable between a retracted position spaced from the wearer's ear and a clasping position in which the lobe of the wearer's ear is clasped between the arm and the projection.

11. A communications headset as in claim 10, including spring means operable to bias the arm either to the ear clasping position or to the retracted position.

12. A communications headset including:
 a. a capsule adapted to fit over the ear of a wearer, and including a first electrical conductor;
 b. a transducer within the capsule;
 c. acoustic tube means communicating with the transducer and adapted to engage the wearer's ear;
 d. microphone means supported on the front end of the capsule, including:
  1. a microphone;
  2. a boom supporting the microphone and extending therefrom to an end adjacent the capsule; and
  3. a second electrical conductor fixed within and insulated from the boom and connected to the microphone;
 e. connector means providing rotatable and tiltable electrical connections between the conductor in the boom and the conductor in the capsule; said connector means including:
  1. a hollow cylindrical upper forward end portion of the capsule, said hollow end portion having apertures aligned along a secant of right cross-section of the cylindrical portion;
  2. a cylindrical member having one end slidably received within said hollow portion, said cylindrical member having a slot in its periphery aligned with said apertures;
  3. a swivel joint connecting the boom and the other end of said cylindrical member for relative rotation and tilting movement, said conductor in the boom extending through the joint and the cylindrical member and engaging the first conductor;
  4. a retainer slidable through the apertures and the slot when they are aligned and thereby effective to prevent relative movement of said cylindrical member and said hollow portion; and
  5. a cap having frictional engagement with the outside of said hollow end portion and covering the apertures to lock the retainer in place.

13. Apparatus for connecting a conduit to a capsule for rotatable and tiltable movement with respect to the capsule, comprising:
 1. a hollow cylindrical portion of the capsule, said portion having an aperture extending transversely;
 2. a member having one end slidably received within the hollow portion, said one end having a transverse opening aligned with the aperture;
 3. a swivel joint rotatably and tiltably connecting the conduit to the other end of the member;
 4. a retainer received in the aperture and in the opening, said retainer being effective to prevent movement of the member with respect to the hollow portion; and
 5. a cylindrical cap engaging the outside of the hollow portion and covering the aperture to hold the retainer in place.

14. Apparatus for connecting a conduit to a capsule for rotatable and tiltable movement with respect to the capsule while maintaining an electrical connection between a conductor in the conduit and a conductor in the capsule, comprising:
 1. a hollow cylindrical portion of the capsule, said portion having an aperture extending transversely;
 2. a member having one end slidably received within the hollow portion and insulatingly supporting said first-mentioned conductor in engagement with said conductor in the capsule, said one end having a transverse opening aligned with the aperture;
 3. a swivel joint rotatably and tiltably connecting the conduit to the other end of the member, said first-mentioned conductor extending through the conduit, the joint and the member;
 4. a retainer received in the aperture and in the opening, said retainer being effective to prevent movement of the member with respect to the hollow portion; and
 5. a cylindrical cap engaging the outside of the hollow portion and covering the aperture to hold the retainer in place.

15. Apparatus as in either of claims 13 and 14, in which:
 a. said hollow portion of the capsule has two parallel apertures, each extending along one of two parallel secants of a right cross-section of the hollow portion and a slot in the peripheral surface of the hollow portion connecting said apertures;
 b. said member has two transverse openings aligned with the two apertures;
 c. said retainer is U-shaped with its legs received in the parallel apertures and the transverse openings, and with the bight of the U received in the slot; and
 d. said cap covers both apertures and the slot.

16. Apparatus as in claim 14, including:
 a. a first pair of conductors in the conduit;
 b. a second pair of conductors in the capsule; and
 c. means in said member supporting the conductors of said first pair in respective engagement with the conductors of said second pair when the member is received in said hollow cylindrical portion of the capsule.

17. Apparatus as in either of claims 13 and 14, including a flange on the cap to engage the end of the hollow portion of the capsule.

* * * * *